(12) United States Patent
Cho et al.

(10) Patent No.: US 12,344,238 B2
(45) Date of Patent: Jul. 1, 2025

(54) DRIVING ASSISTANCE METHOD AND DRIVING ASSISTANCE DEVICE

(71) Applicant: Nissan Motor Co., Ltd., Yokohama (JP)

(72) Inventors: Kibum Cho, Kanagawa (JP); Masahiro Kobayashi, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 235 days.

(21) Appl. No.: 18/043,065

(22) PCT Filed: Aug. 28, 2020

(86) PCT No.: PCT/JP2020/032623
§ 371 (c)(1),
(2) Date: Feb. 27, 2023

(87) PCT Pub. No.: WO2022/044264
PCT Pub. Date: Mar. 3, 2022

(65) Prior Publication Data
US 2023/0303065 A1    Sep. 28, 2023

(51) Int. Cl.
*B60W 30/09* (2012.01)
*B60W 30/165* (2020.01)
(Continued)

(52) U.S. Cl.
CPC .......... *B60W 30/09* (2013.01); *B60W 30/165* (2013.01); *B60W 30/182* (2013.01); *B60W 40/02* (2013.01); *G06V 20/58* (2022.01); *B60W 2420/403* (2013.01); *B60W 2554/402* (2020.02); *B60W 2556/50* (2020.02)

(58) Field of Classification Search
CPC .... B60W 10/04; B60W 10/184; B60W 10/20; B60W 2420/403; B60W 2420/408; B60W 2520/10; B60W 2552/05; B60W 2554/402; B60W 2554/4026; B60W 2554/4029; B60W 2554/802; B60W 2554/804; B60W 2555/60; B60W 2556/50; B60W 30/09; B60W 30/165; B60W 30/17; B60W 30/18027; B60W 30/182; B60W 40/02; G06V 20/58
See application file for complete search history.

(56) References Cited

U.S. PATENT DOCUMENTS 9,058,247 B2 *   6/2015  Fukamachi ............... G06T 7/73
10,821,894 B2 * 11/2020  Konstantin ........... G01S 13/867
(Continued)

FOREIGN PATENT DOCUMENTS

GB       2309555 A  *  7/1997  ............... B60T 7/22
JP    2004224093 A  *  8/2004
(Continued)

*Primary Examiner* — Babar Sarwar
(74) *Attorney, Agent, or Firm* — Young Basile Hanlon & MacFarlane, P.C.

(57) ABSTRACT

A driving assistance device includes: a sensor (camera) configured to detect an object in front of a host vehicle; and a controller. The controller sets a detection range of the sensor (camera), and when the host vehicle is stopped, the controller extends the detection range in a vehicle width direction as compared with when the host vehicle is traveling following the preceding vehicle.

7 Claims, 7 Drawing Sheets

(51) Int. Cl.
  *B60W 30/182* (2020.01)
  *B60W 40/02* (2006.01)
  *G06V 20/58* (2022.01)

(56) References Cited

U.S. PATENT DOCUMENTS

| | | | | |
|---|---|---|---|---|
| 11,046,311 | B2* | 6/2021 | Hirano | B60W 30/16 |
| 11,358,600 | B2* | 6/2022 | Ziegler | G08G 1/165 |
| 2003/0028291 | A1* | 2/2003 | Matsuura | G06V 20/58 |
| | | | | 356/3 |
| 2007/0297288 | A1* | 12/2007 | Boecker | G08G 1/167 |
| | | | | 367/96 |
| 2018/0222480 | A1* | 8/2018 | Shokonji | B60W 30/17 |
| 2019/0061743 | A1* | 2/2019 | Ozawa | B60W 20/15 |
| 2023/0294672 | A1* | 9/2023 | Kato | B60W 50/14 |
| | | | | 701/301 |

FOREIGN PATENT DOCUMENTS

| | | | |
|---|---|---|---|
| JP | 2006-7918 A | 1/2006 | |
| JP | 2006007918 A * | 1/2006 | |
| WO | WO-2006034893 A1 * | 4/2006 | B60W 30/16 |
| WO | 2017/009940 A1 | 1/2017 | |

* cited by examiner

DRIVING ASSISTANCE METHOD AND DRIVING ASSISTANCE DEVICE

TECHNICAL FIELD

The present invention relates to a driving assistance method and a driving assistance device.

BACKGROUND

There is a conventionally known invention in which a host vehicle is made to automatically follow a preceding vehicle (WO2017/009940). The invention disclosed in WO2017/009940 detects the number of departure requests when the host vehicle is stopped due to waiting for a traffic signal, and sets a departure permission period according to the number of detected departure requests.

SUMMARY

When the host vehicle departs following the preceding vehicle from a stopped state, it is required to detect an object that may enter in front of the host vehicle.

The present invention has been made in view of the above problem, and a purpose of the present invention is to provide a driving assistance method and a driving assistance device capable of detecting an object that may enter in front of the host vehicle.

In a driving assistance method according to one aspect of the present invention, a detection range of a sensor for detecting an object in front of a host vehicle is set, and when the host vehicle is stopped, the detection range is extended in a vehicle width direction as compared with when the host vehicle is traveling following a preceding vehicle.

The present invention makes it possible to detect an object that may enter in front of the host vehicle.

DETAILED DESCRIPTION

Figure 1:
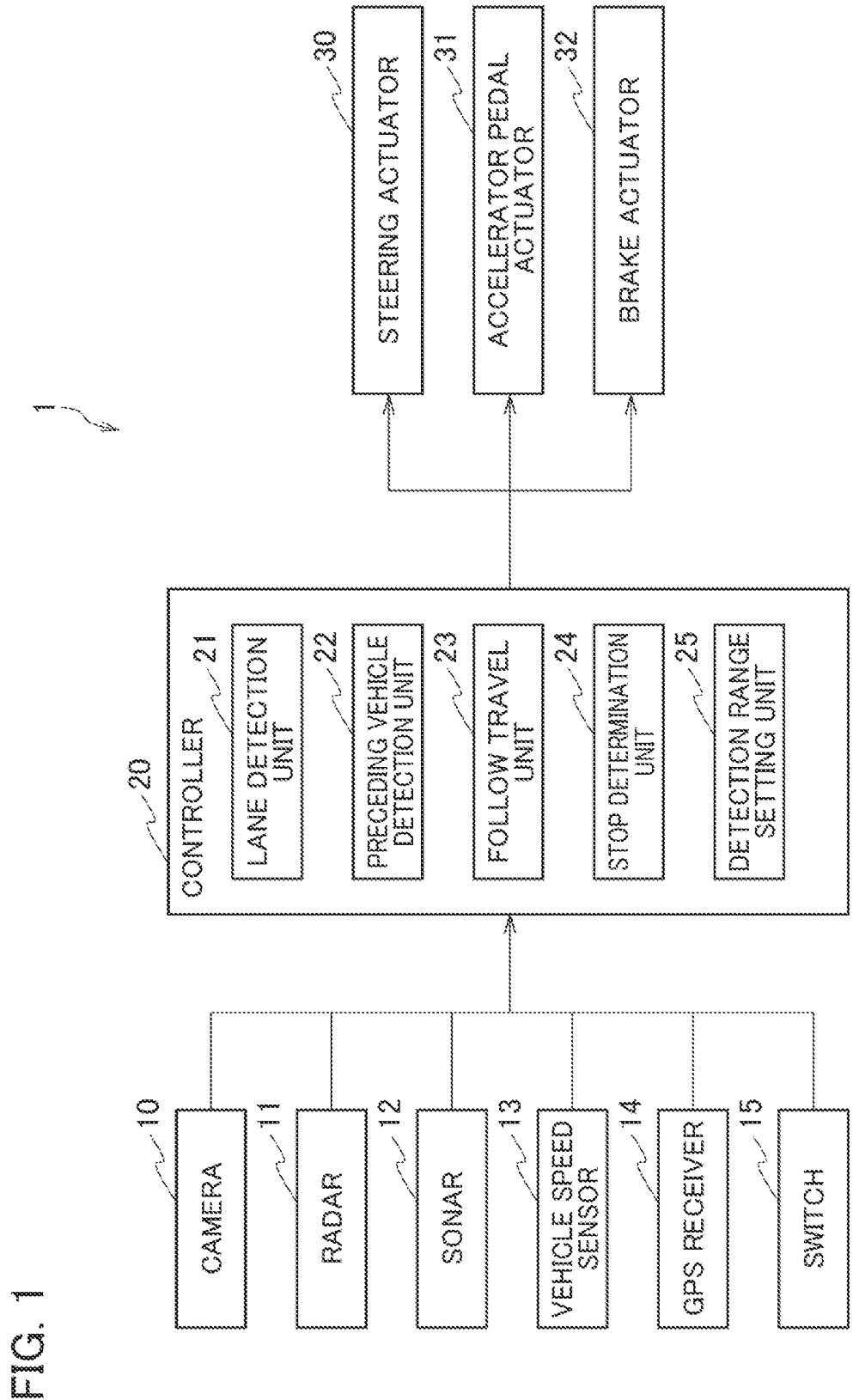
FIG. 1 illustrates the configuration of a driving assistance device 1 according to an embodiment of the present invention.

An embodiment of the present invention will be described below with reference to the drawings. In the drawings, the same parts are denoted by the same reference numerals and the description thereof is omitted.

A configuration example of a driving assistance device 1 will be described with reference to FIG. 1.

The driving assistance device 1 is installed in a host vehicle provided with automatic driving functions. The automatic driving functions include ACC (adaptive cruise control), lane keeping, auto lane change, auto parking, and the like. In the present embodiment, the driving assistance device 1 is mainly used for the ACC. The ACC is an automatic driving function that automatically controls the acceleration and deceleration of a host vehicle with a speed set by a user as an upper limit, and makes the host vehicle follow a preceding vehicle. At this time, inter-vehicle control between the vehicles is also performed to maintain the distance between the vehicles according to the set speed.

Follow control includes control to make the host vehicle follow the preceding vehicle after detecting the preceding vehicle's departure when the host vehicle is stopped due to waiting for a traffic signal, a traffic jam, or the like.

As illustrated in FIG. 1, the driving assistance device 1 includes a camera 10, a radar 11, a sonar 12, a vehicle speed sensor 13, a GPS receiver 14, a switch 15, a controller 20, a steering actuator 30, an accelerator pedal actuator 31, and a brake actuator 32.

A plurality of cameras 10 are installed at the front, the lateral sides, and the rear of the host vehicle, and also installed at the side mirrors thereof. The camera 10 has an imaging element such as a charge-coupled device (CCD) or a complementary metal oxide semiconductor (CMOS). The camera 10 detects objects existing around the host vehicle (pedestrians, bicycles, two-wheeled vehicles, other vehicles, and so on), and information about the surroundings of the host vehicle (marking lines, traffic lights, signs, crosswalks, intersections, and so on). The camera 10 outputs captured images to the controller 20.

A plurality of radars 11 are installed at the front, the front-lateral sides, and the rear-lateral sides of the host vehicle. The radar 11 emits radio waves to objects around the host vehicle and measures the distance and the direction to the objects by measuring the reflected waves. The radar 11 outputs the measured data to the controller 20.

The sonar 12 is installed at the front bumper or front grille. The sonar 12 emits ultrasonic waves and measures the reflected waves to determine the distance and the direction to objects in the vicinity of the host vehicle (e.g., about 1 to 2 m). The sonar 12 outputs the measured data to the controller 20.

The vehicle speed sensor 13 detects the speed of the host vehicle and outputs the detected speed to the controller 20.

The GPS receiver 14 detects the position information of the host vehicle on the ground by receiving radio waves from satellites. The position information of the host vehicle detected by the GPS receiver 14 includes latitude information and longitude information. Note that the method of detecting the position information of the host vehicle is not limited to the GPS receiver 14. For example, positions may be estimated using a method called odometry. Odometry is a method of estimating the position of the host vehicle by determining the amount of travel of the host vehicle and the direction of the host vehicle according to the rotation angle and the rotation angular speed of the host vehicle. The position where the GPS receiver 14 is installed is not particularly limited, and as an example, the GPS receiver 14 is installed on the instrument panel of the host vehicle. The GPS receiver 14 outputs the detected position information to the controller 20.

A plurality of switches 15 are installed in the steering wheel. The plurality of switches 15 include a switch for selecting a radio channel, a switch for adjusting a sound volume, a switch for starting the ACC, a switch for adjusting speed controlled by the ACC, a switch for setting the distance between the vehicles when the ACC is being carried out, a switch for starting follow travel when the preceding vehicle departs, and the like. In the present embodiment, the switch 15 is described as a physical switch; however, the switch 15 is not limited to this physical switch. The switch 15 may be a virtual switch. When the switch 15 is a virtual switch, the switch 15 may be displayed on a touch panel used in a navigation device.

The controller 20 is an Electronic Control Unit (ECU) having a CPU (central processing unit), a ROM (read only memory), a RAM (random access memory), and a CAN (controller area network) communication circuit. A computer program is installed in the controller 20 for causing the controller 20 to function as the driving assistance device 1. By executing the computer program, the controller 20 functions as multiple information processing circuits provided in the driving assistance device 1. Here, an example will be described in which the multiple information processing circuits provided in the driving assistance device 1 are realized by software. In addition, it is also possible to configure the information processing circuit by preparing dedicated hardware for executing each information processing described below. In addition, the multiple information processing circuits may be configured by individual hardware. The controller 20 includes a lane detection unit 21, a preceding vehicle detection unit 22, a follow travel unit 23, a stop determination unit 24, and a detection range setting unit 25 as the multiple information processing circuits.

The lane detection unit 21 detects a lane in which the host vehicle is traveling using the image acquired from the camera 10. Specifically, the lane detection unit 21 extracts the marking lines from the image and detects the lane in which the host vehicle is traveling. The lane detection unit 21 may further detect the lane in which the host vehicle is traveling by adding the position information of the host vehicle.

The preceding vehicle detection unit 22 detects a preceding vehicle that is present in front of the host vehicle using the image acquired from the camera 10. Further, the preceding vehicle detection unit 22 detects the distance between the host vehicle and the preceding vehicle, the relative speed of the preceding vehicle to the host vehicle, and the like by using the data acquired from the radar 11. In the present embodiment, the preceding vehicle is defined as a vehicle traveling in the same lane as the lane in which the host vehicle is traveling.

The follow travel unit 23 controls the host vehicle such that the host vehicle travels by automatically following the preceding vehicle. Specifically, when the user switches on the switch to start the ACC, the follow travel unit 23 controls the steering actuator 30, the accelerator pedal actuator 31, and the brake actuator 32 to make the host vehicle follow the preceding vehicle with the speed set in advance by the user as the upper limit. At this time, the follow travel unit 23 also performs inter-vehicle control between the vehicles so as to maintain the distance between the vehicles according to the set speed. The user can also specify the distance between the vehicles.

When a preceding vehicle is not detected when the user switches on the switch to start the ACC, the follow travel unit 23 makes the host vehicle travel at a constant speed based on the set speed. In addition, when the speed is not set, the follow travel unit 23 can automatically make the host vehicle travel at up to the legal speed of the road where the host vehicle is currently traveling.

The stop determination unit 24 determines whether the host vehicle has stopped. Specifically, when the speed of the host vehicle measured by the vehicle speed sensor 13 is 0 km/h, the stop determination unit 24 determines that the host vehicle has stopped.

The detection range setting unit 25 sets a detection range. In the present embodiment, the detection range is defined as a range in which the camera 10 detects an object that may interfere with the follow control. An object that may interfere with the follow control is a vehicle that is cutting in, in a case where the host vehicle is traveling. Assume a scenario in which another vehicle cuts in between the host vehicle and the preceding vehicle when the host vehicle is traveling following the preceding vehicle. In this scenario, the follow travel unit 23 decelerates the host vehicle and then makes the host vehicle follow the vehicle that has cut in. Alternatively, the follow travel unit 23 may stop the host vehicle and cancel the follow control.

An object that may interfere with the follow control is a pedestrian or a bicycle in a case where the host vehicle is stopped. It is possible to say that a pedestrian or a bicycle is an object that may enter in front of the host vehicle when the host vehicle is stopped.

Figure 2:
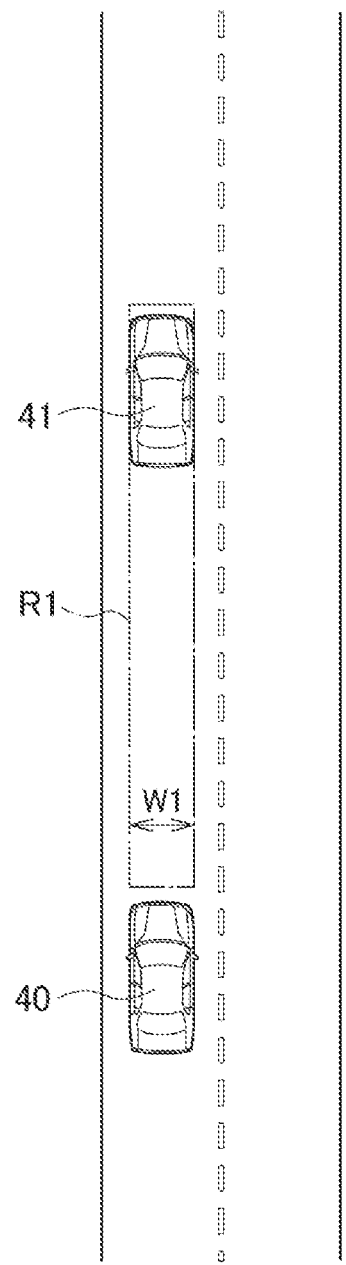
FIG. 2 illustrates an example of a detection range.

Next, the detection range set by the detection range setting unit 25 will be described with reference to FIGS. 2 and 3. The scenario illustrated in FIG. 2 is a scenario in which a host vehicle 40 is automatically traveling following a preceding vehicle 41. In this scenario, the detection range setting unit 25 sets a detection range R1. The detection range R1 is the area on the lane where the host vehicle 40 is to travel. The size of the detection range R1 will be described. The length of the detection range R1 in the vehicle width direction is the vehicle width W1 of the host vehicle 40 as illustrated in FIG. 2. The length of the detection range R1 in the traveling direction is from the leading end of the host vehicle 40 to the leading end of the preceding vehicle 41.

The size of the detection range R1 is not limited to that illustrated FIG. 2. As illustrated by the detection range R2 in FIG. 3, the length in the vehicle width direction may be the width W2 of the lane in which the host vehicle 40 is traveling. In addition, the length in the traveling direction may be from the leading end of the host vehicle 40 to the rear end of the preceding vehicle 41.

Figure 3:
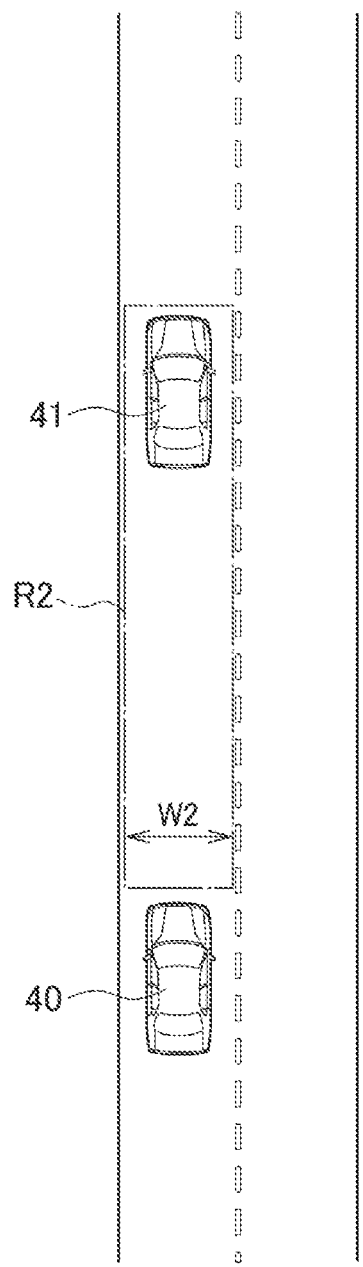
FIG. 3 illustrates another example of a detection range.
Figure 4:
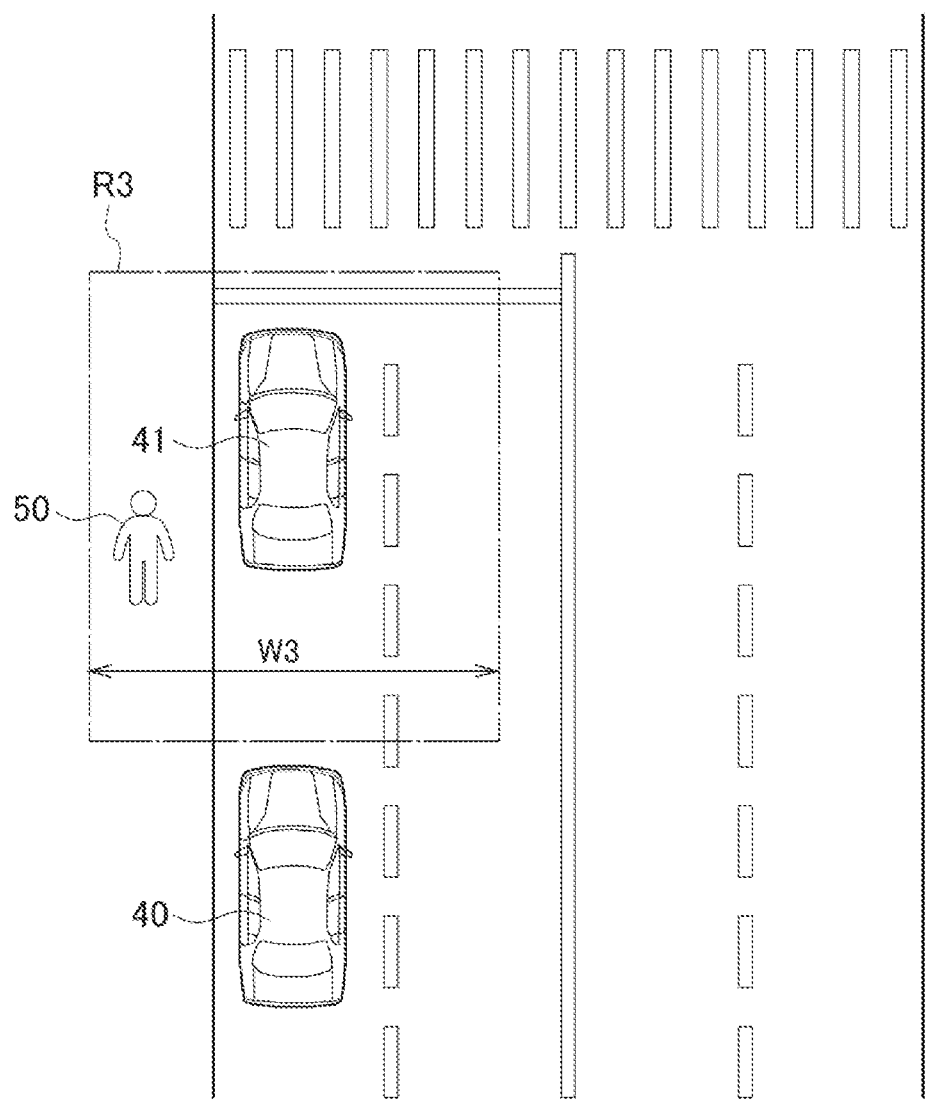
FIG. 4 illustrates another example of a detection range.

The detection ranges R1 to R2 described in FIGS. 2 to 3 are areas that are set when the host vehicle 40 is automatically traveling following the preceding vehicle 41. Next, the detection range when the host vehicle 40 is stopped will be described with reference to FIG. 4. The scenario illustrated in FIG. 4 is a scenario in which the preceding vehicle 41 and the host vehicle 40 are stopped due to waiting for a traffic signal. After the preceding vehicle 41 has stopped, the follow travel unit 23 automatically stops the host vehicle 40 when having determined that the distance between the vehicles is to be less than a predetermined value. At this time, the follow travel unit 23 maintains the stopped state.

When the host vehicle 40 is stopped, the detection range setting unit 25 extends the detection range in the vehicle width direction as compared with when the host vehicle 40 is traveling. The extended detection range is illustrated in FIG. 4 as R3. The detection range R3 illustrated in FIG. 4 is wider in the vehicle width direction than the detection range R1 illustrated in FIG. 2 or the detection range R2 illustrated in FIG. 3. This enables the controller 20 to detect an object (pedestrian 50) that may enter in front of the host vehicle 40 in a wider area when the host vehicle 40 is stopped, as compared with when the host vehicle 40 is traveling. In addition, the controller 20 can more quickly detect an object that may enter in front of the host vehicle when the host vehicle 40 is stopped, as compared with when the host vehicle 40 is traveling.

In a case where the controller 20 detects a pedestrian 50 in the detection range R3 when the host vehicle 40 is stopped, it is possible to limit the behavior of the host vehicle 40. The details will be described later.

The size of the detection range R3 will be described. The length in the vehicle width direction is about two times the vehicle width of the host vehicle 40. This length is determined by considering the margin for detecting a pedestrian 50 before the host vehicle 40 departs. Accordingly, two times is merely an example, and the present invention is not limited thereto. The length in the traveling direction is from the leading end of the host vehicle 40 to the leading end of the preceding vehicle 41. The length in the vehicle width direction may be 3 m and the length in the traveling direction may be 10 m although these values are not particularly limited.

Next, in the scenario illustrated in FIG. 4, the behavior of the host vehicle 40 when a pedestrian 50 is detected and not detected in the detection range R3 will be described. First, a case where a pedestrian 50 is not detected in the detection range R3 will be described. Even when the preceding vehicle 41 departs, the host vehicle 40 does not depart automatically. The host vehicle 40 does not depart automatically unless a user's departure instruction (follow departure instruction) is input. The follow departure instruction is input by operating a switch for starting follow travel or by operating an accelerator pedal. In a case where the follow travel unit 23 receives the follow departure instruction from the user when the preceding vehicle 41 departs, the follow travel unit 23 automatically causes the host vehicle 40 to depart.

Next, a case where a pedestrian 50 is detected in the detection range R3 will be described. In this case, even when the follow departure instruction is input from the user, the follow travel unit 23 prohibits the host vehicle 40 from departing following the preceding vehicle 41 while the pedestrian 50 is detected. Thereafter, when the pedestrian 50 is no longer detected in the detection range R3, the follow travel unit 23 automatically causes the host vehicle 40 to depart.

Alternatively, when a pedestrian 50 is detected in the detection range R3, the follow travel unit 23 may cancel the follow departure system. In this case, the host vehicle 40 does not automatically depart even when the follow departure instruction is input from the user and the pedestrian 50 is no longer detected in the detection range R3. Thus, when a pedestrian 50 is detected after the host vehicle 40 has stopped, the departure of the host vehicle 40 following the preceding vehicle is prevented in the area where the pedestrian 50 may pass in front of the host vehicle 40. Further, since the user cannot use the follow departure system, the user has to manually make the host vehicle 40 depart. Thus, it is possible to make the host vehicle 40 depart in the state where the user is made to check ahead of the host vehicle 40. The stopped state is maintained even when the follow departure system is cancelled.

Figure 5:
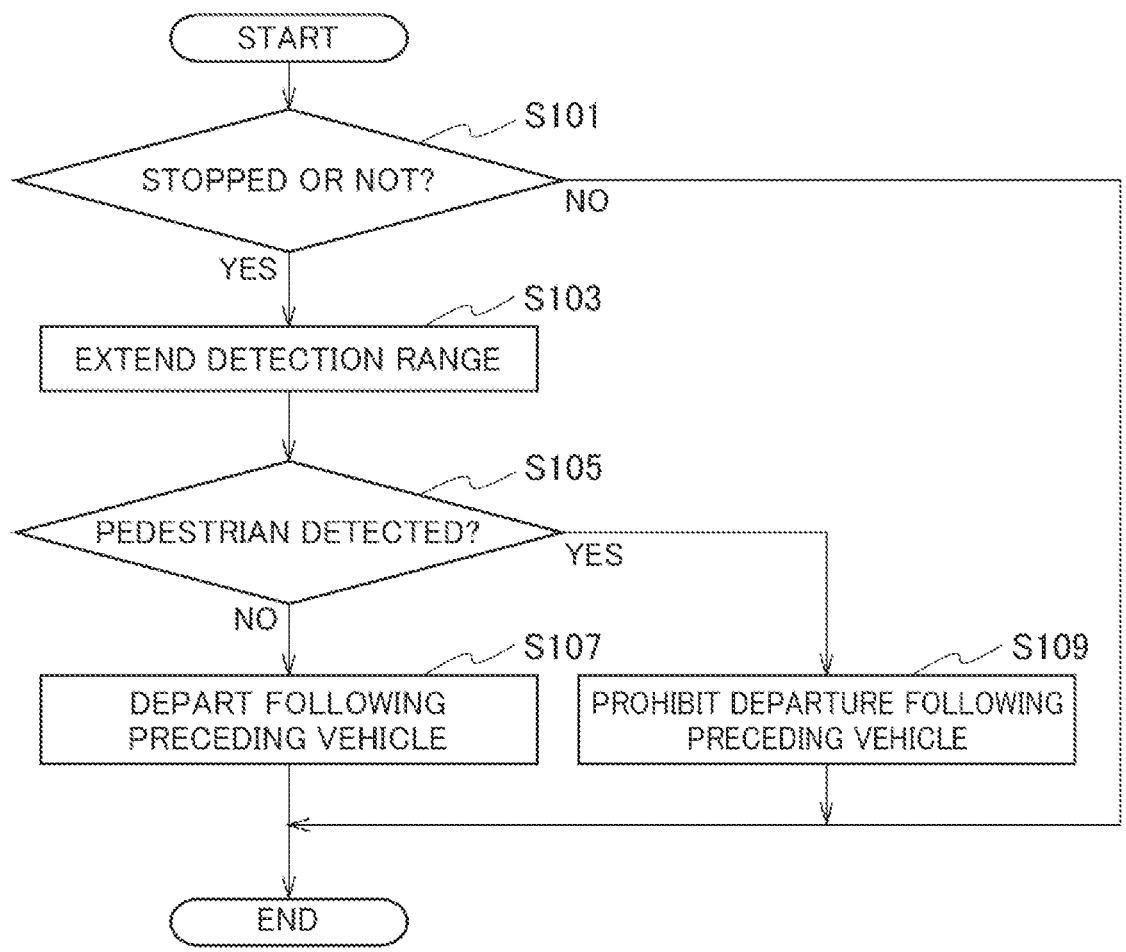
FIG. 5 is a flowchart illustrating an example of operation of the driving assistance device 1.

Next, an operation example of the driving assistance device 1 will be described with reference to the flowchart of FIG. 5.

In step S101, the stop determination unit 24 uses the speed of the host vehicle 40 measured by the vehicle speed sensor 13 to determine whether or not the host vehicle 40 has stopped. When the speed of the host vehicle 40 is 0 km/h (YES in step S101), the processing proceeds to step S103. When the speed of the host vehicle 40 is not 0 km/h (NO in step S101), the series of processing ends.

In step S103, the detection range setting unit 25 extends the detection range in the vehicle width direction as compared with when the host vehicle 40 is traveling (see FIG. 4).

The processing proceeds to step S105, and when a pedestrian 50 is detected in the extended detection range R3 (YES in step S105), the follow travel unit 23 prohibits the host vehicle 40 from departing following the preceding vehicle 41. That is, the follow travel unit 23 cancels the follow departure system. Meanwhile, when a pedestrian 50 is not detected in the extended detection range R3 (NO in step S105), the follow travel unit 23 automatically causes the host vehicle 40 to depart so as to follow the preceding vehicle 41 in accordance with the follow departure instruction from the user.

(Operational Effect)

As described above, the driving assistance device 1 according to the present embodiment provides the following operational effect.

The detection range setting unit 25 sets the detection range of a sensor for detecting an object in front of the host vehicle 40. When the host vehicle 40 is stopped, the detection range setting unit 25 extends the detection range in the vehicle width direction as compared with when the host vehicle 40 is traveling following the preceding vehicle 41 (see FIG. 4). This enables the controller 20 to detect an object (pedestrian 50) that may enter in front of the host vehicle 40 in a wider area when the host vehicle 40 is stopped, as compared with when the host vehicle 40 is traveling. In addition, the controller 20 can more quickly detect an object that may enter in front of the host vehicle when the host vehicle 40 is stopped, as compared with when the host vehicle 40 is traveling.

In addition, the detection range when the host vehicle 40 is traveling is smaller than that when the host vehicle 40 is stopped. Accordingly, when the host vehicle 40 is traveling, the controller 20 can prevent control that is based on an object (an adjacent vehicle that is traveling, a tree, a pedestrian walking on sidewalk, or the like) other than an object that may interfere with the follow control. An adjacent vehicle that is traveling means a vehicle traveling in a lane adjacent to the lane where the host vehicle 40 is traveling.

When an object is detected in a detection range extended in the vehicle width direction, the follow travel unit 23 prohibits the host vehicle 40 from departing following the preceding vehicle 41. Thus, when a pedestrian 50 is detected after the host vehicle 40 has stopped, the departure of the host vehicle 40 following the preceding vehicle 41 is prevented in the area where the pedestrian 50 may pass in front of the host vehicle 40. Further, since the user cannot use the follow departure system, the user has to manually make the host vehicle 40 depart. Thus, it is possible to make the host vehicle 40 depart in the state where the user is made to check ahead of the host vehicle 40.

Note that the controller 20 may determine whether or not the host vehicle 40 is traveling on a limited-access road based on the position information of the host vehicle 40. A limited-access road is defined in Japan as a road on which only vehicles designated by the road administrator are allowed to travel. A typical limited-access road is an express highway. When it is determined that the host vehicle 40 is traveling on a limited-access road and in a case where an object is detected in a detection range extended in the vehicle width direction, the controller 20 may prohibit the host vehicle 40 from departing following the preceding vehicle 41. The detection of a pedestrian 50 or a bicycle on a limited-access road where there are usually no pedestrians 50 or bicycles may indicate that incorrect position information has been recognized due to a decrease in the accuracy of the GPS receiver 14. In such a case, the controller 20 prohibits the host vehicle 40 from departing following the preceding vehicle 41, which improves the reliability of the system.

Although a description has been given in which the detection range setting unit 25 extends the detection range by using the stopping of the host vehicle 40 as a trigger, this is not necessarily limited to extending the detection range at the moment when the host vehicle 40 has stopped. That is, after the host vehicle 40 has stopped, the detection range setting unit 25 may not change the detection range until a predetermined time elapses, and the detection range setting unit 25 may extend the detection range after a predetermined time has elapsed. This is achieved by setting two modes (first mode and second mode) as modes for permitting the host vehicle 40 to depart following the preceding vehicle 41.

The first mode and second mode will be described. The first mode is a mode in which the departure of the host vehicle 40 following the preceding vehicle 41 is permitted in a case where the preceding vehicle 41 has departed before a first predetermined time elapses after the host vehicle 40 has stopped. The second mode is a mode in which the departure of the host vehicle 40 following the preceding vehicle 41 is permitted in a case where the preceding vehicle 41 has departed before a second predetermined time longer than the first predetermined time elapses. One example of the first predetermined time is 3 seconds and one example of the second predetermined time is 30 seconds. The first and second modes are set by the controller 20. The detection range setting unit 25 does not change the detection range in the first mode, and may extend the detection range in the second mode.

Figure 6:
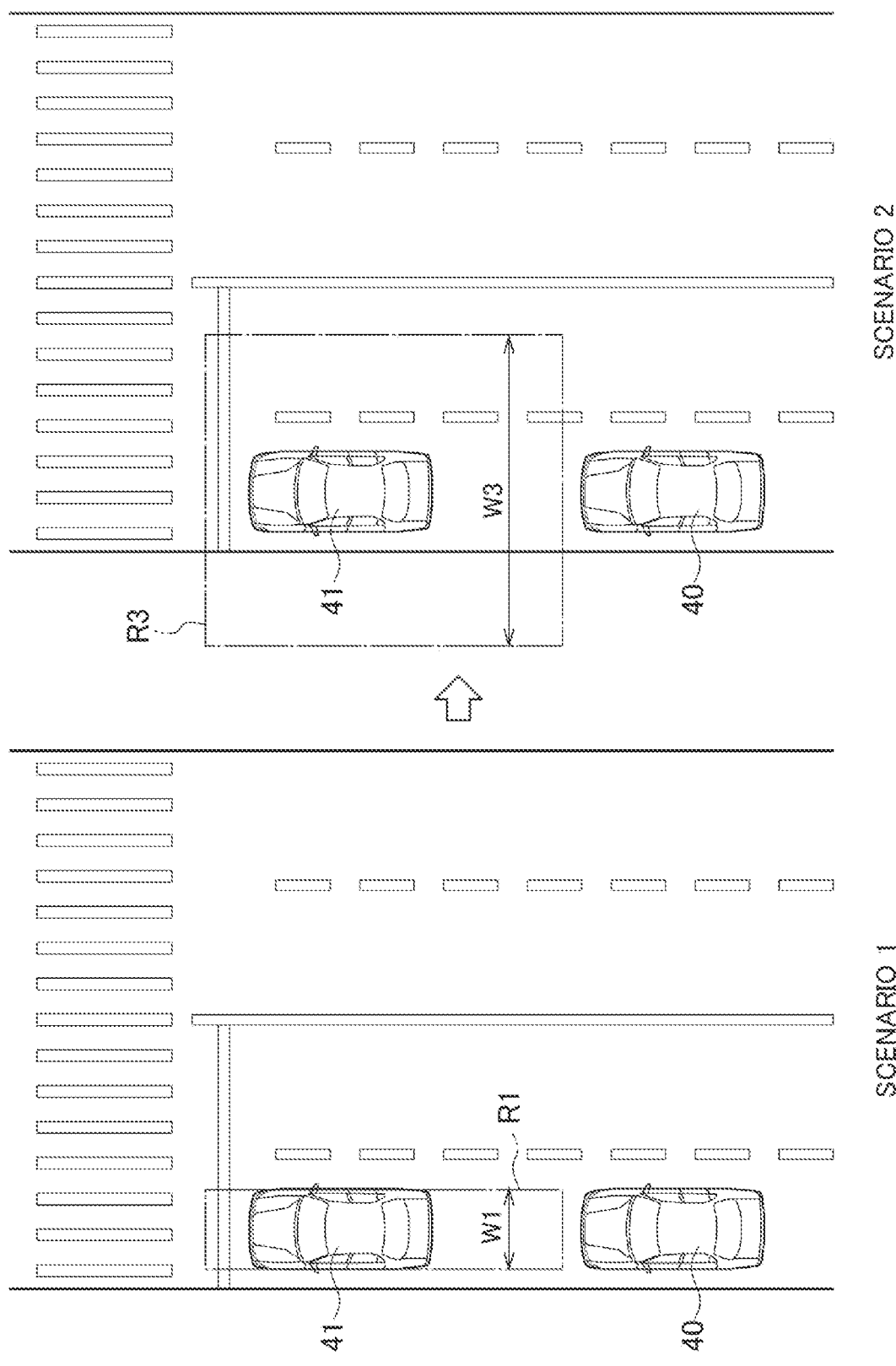
FIG. 6 illustrates an example of how to set the detection range.

A specific example will be described with reference to FIG. 6. Scenario 1 illustrated in FIG. 6 is a scenario from when the host vehicle 40 has stopped until the first predetermined time (3 seconds) elapses. That is, in scenario 1, the host vehicle 40 is in the first mode. As illustrated in FIG. 6, the detection range setting unit 25 does not change the detection range R1 in the first mode. Scenario 2 illustrated in FIG. 6 is a scenario from when the first predetermined time (3 seconds) has elapsed until the second predetermined time (30 seconds) elapses. That is, in scenario 2, the host vehicle 40 is in the second mode. As illustrated in FIG. 6, the detection range setting unit 25 extends the detection range R1 in the vehicle width direction in the second mode (the extended detection range is illustrated as R3).

The second mode has a departure permission time longer than that of the first mode. When the departure permission time is extended, the stopped time is also extended. Accordingly, in the second mode, the detection range is extended in the vehicle width direction, which makes it easier to detect an object. When the preceding vehicle 41 does not depart even after the second predetermined time has elapsed, the follow travel unit 23 cancels the follow departure system.

The detection range set by the detection range setting unit 25 in the present embodiment is the detection range of the camera 10. An object detected by the camera 10 is at least either one of a pedestrian 50 and a bicycle. By limiting the means for detecting a pedestrian 50 or a bicycle in the detection range R3 extended in the vehicle width direction to the camera 10, it is possible to exclude other vehicles in an adjacent lane near the lane in which the host vehicle 40 is traveling from being detection targets.

The controller 20 may detect a pedestrian 50 or a bicycle based on a change in the rear end of the preceding vehicle 41 shown in the camera image. When a pedestrian 50 or a bicycle passes in front of the host vehicle 40, a change occurs in the image which shows the rear end thereof. When the image of the rear end has changed in this way, the controller 20 may determine that a pedestrian 50 or a bicycle is present. This enables the controller 20 to detect a pedestrian 50 or a bicycle whose shape is difficult to recognize as an object.

Each of the functions described in the above embodiment may be implemented by one or more processing circuits. The processing circuit includes a programmed processing device such as a processing device including an electrical circuit. The processing circuit also includes devices such as application specific integrated circuits (ASIC) arranged to perform the described functions and circuit components.

As described above, although the embodiment of the present invention has been described, it should not be understood that the arguments and drawings forming part of this disclosure are intended to limit the present invention. Various alternative embodiments, examples, and operational techniques will be apparent to those skilled in the art from this disclosure.

In the above embodiment, the sensor for detecting an object in the detection range set by the detection range setting unit 25 is described as the camera 10; however, the sonar 12 may be added in addition to the camera 10. The detection target of the camera 10 is a pedestrian 50 or a bicycle while the detection target of the sonar 12 is not particularly limited. The method of how the sonar 12 detects an object will be described. When the host vehicle 40 is stopped, in a case where the distance information in the lane where the host vehicle 40 is stopped changes by more than a predetermined value, it is determined that an object has been detected. It may also be determined that an object has been detected when the distance information suddenly changes. The sonar 12 is used only when the host vehicle 40 is stopped.

Figure 7:
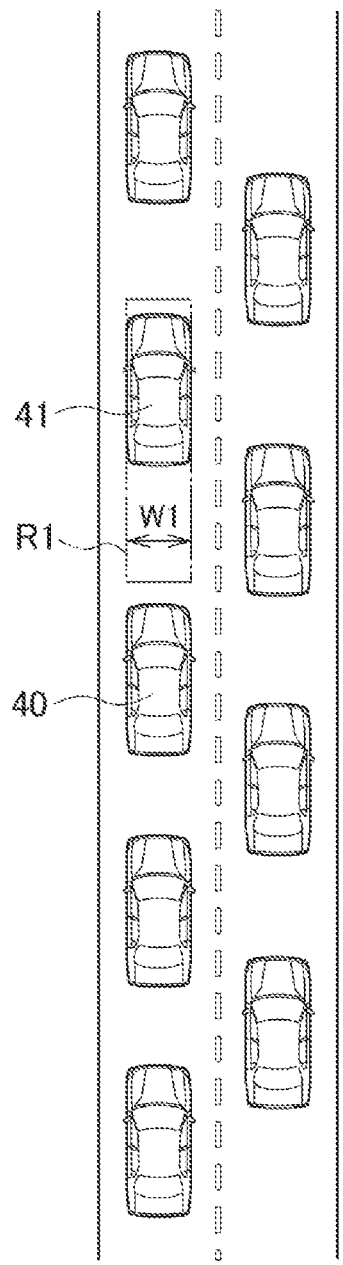
FIG. 7 illustrates another example of a detection range.

When a traffic jam occurs on an expressway, the detection range set by the detection range setting unit 25 becomes the detection range R1 as illustrated in FIG. 7. The size of the detection range R1 has been described above, and thus a description thereof is omitted here.

LIST OF REFERENCE NUMERALS

1: Driving assistance device
10: Camera
11: Radar
12: Sonar
13: Vehicle speed sensor
14: GPS receiver
15: Switch
20: Controller
21: Lane detection unit
22: Preceding vehicle detection unit
23: Follow travel unit
24: Stop determination unit
25: Detection range setting unit
30: Steering actuator
31: Accelerator pedal actuator
32: Brake actuator

The invention claimed is:

1. A driving assistance method including a controller which controls a host vehicle such that the host vehicle automatically travels following a preceding vehicle which is in front of the host vehicle, the method comprising:
   setting a detection range of a sensor for detecting an object in front of the host vehicle;
   when the host vehicle is stopped, extending the detection range in a vehicle width direction as compared with when the host vehicle is traveling following the preceding vehicle; and when an object other than another vehicle is detected in the detection range extended in the vehicle width direction, canceling a system in which the host vehicle departs following the preceding vehicle.

2. The driving assistance method according to claim 1, further comprising:

acquiring position information of the host vehicle;

determining whether or not the host vehicle is traveling on a limited-access road based on the position information; and when it is determined that the host vehicle is traveling on the limited-access road and in a case where the object other than the other vehicle is detected in a detection range extended in the vehicle width direction, prohibiting the host vehicle from departing following the preceding vehicle.

3. The driving assistance method according to claim 1, further comprising:

setting a first mode which permits the host vehicle to depart following the preceding vehicle in a case where the preceding vehicle has departed before a first predetermined time elapses after the host vehicle has stopped;

setting a second mode which permits the host vehicle to depart following the preceding vehicle in a case where the preceding vehicle has departed before a second predetermined time longer than the first predetermined time elapses; and extending the detection range in the vehicle width direction in the second mode.

4. The driving assistance method according to claim 1, wherein the sensor is a camera, and an object detected by the camera is at least either one of a pedestrian and a bicycle.

5. The driving assistance method according to claim 4, wherein a rear end of the preceding vehicle is captured by the camera, the method further comprising:

detecting the pedestrian or the bicycle based on a change in the rear end of the preceding vehicle shown in an image captured by the camera.

6. A driving assistance device which controls a host vehicle such that the host vehicle automatically travels following a preceding vehicle which is in front of the host vehicle, the device comprising:

a sensor configured to detect an object in front of the host vehicle; and a controller configured to:

set a detection range of the sensor;

when the host vehicle is stopped, extend the detection range in a vehicle width direction as compared with when the host vehicle is traveling following the preceding vehicle; and when an object other than vehicles is detected in the detection range extended in the vehicle width direction, cancel a system in which the host vehicle departs following the preceding vehicle.

7. A driving assistance method including a controller which controls a host vehicle such that the host vehicle automatically travels following a preceding vehicle which is in front of the host vehicle, the method comprising:

setting a detection range of a sensor for detecting an object in front of the host vehicle;

when the host vehicle is stopped, extending the detection range in a vehicle width direction as compared with when the host vehicle is traveling following the preceding vehicle; and when a pedestrian is detected in the detection range extended in the vehicle width direction, canceling a system in which the host vehicle departs following the preceding vehicle.

\* \* \* \* \*